United States Patent [19]

Homan et al.

[11] 4,039,505
[45] Aug. 2, 1977

[54] SILOXANE ELASTOMERS CONTAINING SULFUR AND METHOD OF PREPARATION

[75] Inventors: Gary R. Homan; Chi-Long Lee, both of Midland, Mich.

[73] Assignee: Dow Corning Corporation, Midland, Mich.

[21] Appl. No.: 663,327

[22] Filed: Mar. 3, 1976

[51] Int. Cl.$^2$ ............................................ C08L 83/04
[52] U.S. Cl. ........................... 260/37 SB; 260/46.5 G; 260/46.5 UA
[58] Field of Search ................. 260/46.5 UA, 46.5 E, 260/37 SB, 825

[56] References Cited

U.S. PATENT DOCUMENTS

| 3,445,419 | 5/1969 | Vanderlinde | 260/46.5 E X |
| 3,816,282 | 6/1974 | Viventi | 204/159.13 |
| 3,873,499 | 3/1975 | Michael et al. | 260/46.5 UA X |

FOREIGN PATENT DOCUMENTS 2,008,426  9/1970  Germany

Primary Examiner—Lewis T. Jacobs
Attorney, Agent, or Firm—Roger H. Barrousch

[57] ABSTRACT

Mixing a low molecular weight polydimethylsiloxane either linear or cyclic, a mercaptoorganopolysiloxane, an organic peroxide and optionally a filler provides a composition which cures to an elastomer at room temperature or by heating. The elastomers are useful as sealants and rubber articles.

5 Claims, No Drawings

SILOXANE ELASTOMERS CONTAINING SULFUR AND METHOD OF PREPARATION

BACKGROUND OF THE INVENTION

1. Field of the Invention

This invention relates to siloxane elastomers containing sulfur and methods of their preparation.

2. Description of the Prior Art

Compositions containing mercaptoorgano functional siloxanes and aliphatically unsaturated organosiloxanes have been described in the prior art. For example, Viventi in U.S. Pat. No. 3,816,282 teaches silicone rubber compositions which cure at room temperature in the presence of electromagnetic and particulate radiation. The compositions exposed to the radiation for curing comprise an organopolysiloxane having a viscosity of 100 to 100,000 centipoise at 25° C., 0.1 to 2.0 mole percent of the organic groups as silicon-bonded vinyl radicals and from 1.98 to 2.05 organic groups per silicon atom, an organopolysiloxane fluid having the formula

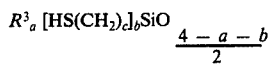

where $R^3$ is alkyl or aryl of up to 18 carbon atoms, $c$ is 1 to 25, $a$ is from 0.088 to 2.08, $b$ is from 0.009 to 0.97 and $a + b$ is from 2.019 to 2.16 and the number of mercapto siloxane units equal or exceed the number of non mercapto siloxane units, and from 0.025% to 1% by weight of the composition of a free radical source which includes certain organic peroxides.

Bazant et al. in German Patent Publication (OLS) No. 2,008,426 discloses five different possibilities to make three dimensionally crosslinked silicone polymers. These reactions were found to proceed in the presence of radical reaction initiators at a temperature of 30°-110° C or by UV light initiation. The five possibilities are defined as follows: One possibility is a reaction between alkenylsiloxanes of the general formula

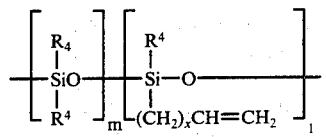

I where $m + l$ is greater than 30, $l{:}m$ is from 1:10 to 1:60, $x$ is 0 to 4 and $R^4$ is alkyl groups of 1 to 6 carbon atoms, cycloalkyl groups of 5 to 8 carbon atoms, aryl groups or siloxy groups, and dithiols of the general formula

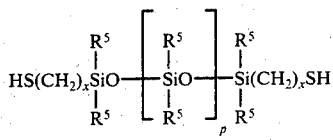

II where $p$ is 0 to 30, $x$ is 1 to 4 and $R^5$ is alkyl groups of 1 to 6 carbon atoms, cycloalkyl groups of 5 to 8 carbon atoms or aryl groups.

The second possibility is reactions between alkenylsiloxanes of the general formula I and high molecular thioalkylpolysiloxanes of the general formula

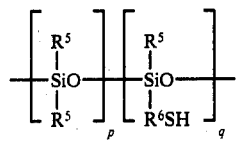

III where $p + q$ is greater than 30, $q{:}p$ is 1:10 to 1:60, $R^5$ is defined above and $R^6$ is an alkylene group of 1 to 6 carbon atoms, a cycloalkylene group of 5 to 8 carbon atoms or an arylene group.

The third possibility is reactions between the thioalkylpolysiloxanes of the general formula III and low molecular alkenylsiloxanes of the general formula

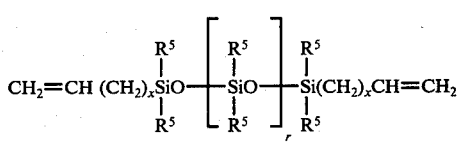

IV where $r$ is 0 to 30, $x$ is 0 to 4 and $R^5$ is defined above.

The fourth possibility is reactions of high molecular thioalkyl- and alkenyl substituted siloxanes of the general formula

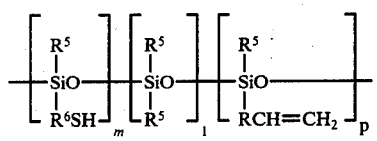

$R^5$ and $R^6$ are defined above.

The fifth possibility is reactions between thioalkylpolysiloxanes and organic diisocyanates.

George A. Gant in U.S. patent application Ser. No. 401,791, filed Sept. 28, 1973, entitled "UV Curable Compositions" and assigned to the same assignee as the present application, discloses a composition which is curable with ultraviolet light consisting essentially of a silocane having 0.1 to 100 mole percent mercapto functional siloxane units of the formula

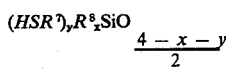

and any other siloxane unit being of the formula

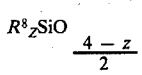

where $x$ is 0 and 2, $y$ is 1 to 2, $x + y$ is 1 to 3, $z$ is 0 to 3, $R^7$ is an alkylene radical and $R^8$ is a monovalent hydrocarbon radical or a monovalent halogenated hydrocarbon radical, a siloxane having 0.1 to 100 mole percent of vinyl siloxane units of the formula

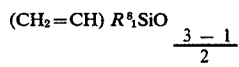

where $l$ is 0 to 2 and $R^8$ is defined above and any other non-vinyl containing siloxane units are defined by formula V, and a photosensitizing amount of a photosensitizer, where the ratio of vinyl to mercapto is from 1:100 to 100:1.

Although the prior art describes that compositions containing mercapto functional siloxanes and vinyl containing siloxanes can be cured and that some compositions cure to elastomeric products, it is not obvious that certain compositions can be cured at room temperature as well as with heat with organic peroxide alone. For example, Viventi requires specific mercapto containing siloxanes and radiation for curing his composition, Bazant et al. place strict limitations on the type of alkenyl siloxanes and mercapto siloxanes which can be combined to provide a three dimensional crosslinked siloxane and finally Gant requires the presence of a photosensitizer and ultraviolet light to cure his compositions. Thus, it was unexpected that low molecular weight alkenyl containing polysiloxanes and a class of mercaptoorganopolysiloxanes could be cured with organic peroxide at both room temperature and by heating.

SUMMARY OF THE INVENTIION

This invention relates to composition which are curable to elastomers at room temperature and with heat where the compositions comprise a low molecular weight polymethylvinylsiloxane, either linear or cyclic, a mercaptoorganopolysiloxane having no more than 8 mol percent —SH containing siloxane units and at least two sulfur atoms per molecule and a molecular weight greater than 2000, an organic peroxide and optionally a filler.

This invention also relates to a method of preparing an elastomer by mixing the polymethylvinylsiloxane, the mercaptoorganopolysiloxane and the organic peroxide below a temperature of 50° C and curing at a temperature above 20° C.

The compositions can be used as sealants which have good adhesion, which cure with non-tacky surfaces and which do not have some of the inhibitions of conventional peroxide cured silicone elastomers or the compositions which are cured with SiH containing siloxanes and platinum catalyst.

DESCRIPTION OF THE INVENTION

This invention relates to a composition curable to an elastomer comprising a material prepared by mixing (A) a polymethylvinylsiloxane consisting essentially of methylvinylsiloxane units, having linear or cyclic structures or mixtures thereof, said linear structures having hydroxyl endblocking or trimethylsiloxy endblocking, having an average of at least three siloxane units per molecule and a molecular weight sufficient to provide a viscosity of less than 0.05 Pa.s at 25° C., (B) a mercaptoorganopolysiloxane consisting essentially of dimethylsiloxane units, trimethylsiloxane units, units of the formula

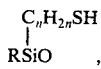

units of the formula

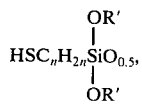

units of the formula

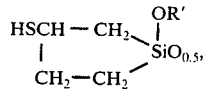

units of the formula

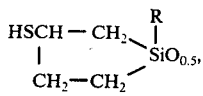

units of the formula

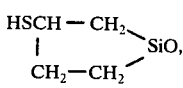

and units of the formula

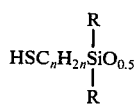

wherein R is a monovalent radical selected from the group consisting of alkyl radicals of from 1 to 3 carbon atoms inclusive and phenyl radicals, R' is methyl or ethyl and $n$ has a value of from 1 to 4 inclusive, there being in said mercaptoorganopolysiloxane an average of at least two sulfur containing siloxane units per molecule and no more than 8 mol percent —SH containing siloxane units based on the total numer of siloxane units in the mercaptoorganopolysiloxane, the molecular weight of the mercaptoorganopolysiloxane being at least 2000, (A) and (B) being combined in a weight ratio sufficient enough to provide a molar ratio of moles of —SH group in (B) per mole of vinyl radical in (A) of 1:1 to 10:1, (C) an organic peroxide in an amount of from 1.4 to 5.5 parts by weight based on 100 parts by weight of (A) and (B) combined, and (D) a filler in an amount of from 0 to 100 parts by weight per 100 parts by weight of (A) and (B) combined.

The compositions of the present invention are prepared by mixing the ingredients (A), (B), (C) and (D). The resulting mixtures undergo some reaction as soon as they are mixed, but have a reasonable pot life to be useful. Inasmuch as, crosslinking reaction begins upon mixing the combination of (A), (B), (C) and (D) should not be prepared too far in advance of the time cure is desired. Thus, one should determine the pot life by using small samples for each composition prior to compounding large batches of the compositions, defined herein. The pot life can range from a few hours up to several weeks at room temperature. For purposes of storage, the compositions of this invention are two component or two package compositions. One can combine (A) and (C), and optionally (D) for one package and (B) as a second package or one can combine part of (A), all of (C) and optionally part of (D) in one package and in a second package combine the remainder of (A) and the remainder of (D) and all of (B). Various combinations can be used for purposes of storage, however it is cautioned that the combination of (B) and (C) may result in gelation of that mixture on storage.

Preferably, (A), (B), (C) and (D) are mixed at a temperature below 50° C. so that one does not activate the organic peroxide prematurally and cause gelation or curing during the mixing procedure.

After (A), (B), (C) and (D) are mixed, the composition will cure at room temperature, above 20° C. Compositions are best cured in the presence of oxygen gas, such as air.

The type of mixing procedure is not critical as long as it does not generate excessive heating. For high viscosity composition, such as those containing gums or high filler loadings, a two-roll mill can be used for mixing but is preferably cooled, such as by using the internal water cooled type mill. Also the composition can be combined and mixed by using a multi-feed extruder wherein two or more components can be fed into a mixer and the composition is extruded from the apparatus. The resulting extruded article can be then left to cure at room temperature or it can be heated to accelerate the cure.

The polydimethylvinylsiloxanes of (A) can be linear, cyclic or mixtures of linear and cyclic molecules. The liner polymethylvinylsiloxanes can be endblocked with hydroxyl radicals or trimethylsiloxy units with viscosities up to 0.05 pascal·second (Pa·s) at 25° C., preferably from 0.01 to 0.04 Pa·s at 25° C. The linear polymethylvinylsiloxanes have an average of at least three methylvinylsiloxane units per molecule. The cyclic polymethylvinylsiloxanes have at least three methylvinylsiloxane units per molecule. The cyclic polymethylvinylsiloxanes can be mixtures of different molecular weight cyclic molecules, such as mixtures containing species having from 3 to 6 methylvinylsiloxane units per molecular. The polymethylvinylsiloxane, (A), can also be mixtures of linear and cyclic species.

The mercaptoorganopolysiloxanes of (B) contain combinations of the following units: dimethylsiloxane units, trimethylsiloxane units, and units of the formulae

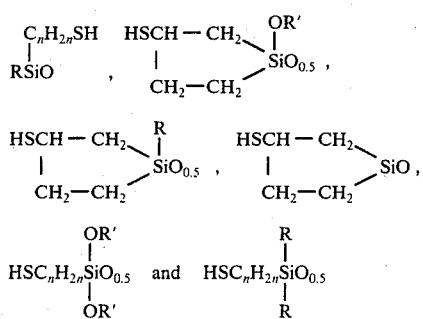

where R is an alkyl of 1 to 3 carbon atoms including methyl, ethyl and propyl, or phenyl, R' is methyl or ethyl and n is 1 to 4 inclusive, preferably n is 3 and R and R' are methyl. The mercaptoorganopolysiloxanes for use in the present invention are those which have at least two sulfur atoms per molecule and no more than 8 mol percent —SH containing siloxane units based on the number of siloxane units in the mercaptoorganopolysiloxane, and a molecular weight of at least 2000. Preferably, the mercaptoorganopolysiloxanes have a molecular weight greater than 5000 and no more than 3.5 weight percent —SH group and the most preferred are those with no more than 2.2 weight percent —SH group. The mercaptoorganopolysiloxanes are known in the art as evidenced by the prior art cited herein. The silacyclopentane mercapto siloxanes can be prepared by the method defined in U.S. Pat. No. 3,655,713 which is hereby incorporated by reference to show the silacyclopentane mercapto siloxanes and their preparation. The mercaptoorganosiloxanes which contain endblocking units of the formula

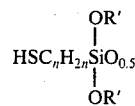

can be prepared by reacting a hydroxyl endblocked polydimethylsiloxane and a mercaptoalkyl trialkoxysilane of the formula

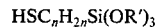

in the presence of solid potassium hydroxide or potassium silanolate catalysts. The potassium silanolate catalyst is preferred for the higher viscosity polydimethylsiloxanes. The mercaptoalkyltrialkoxysilane is preferably used in excess of about 10 weight percent over stoichiometric amounts. The resulting product is essentially a polydimethylsiloxane endblocked with the units of the formula

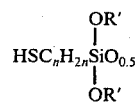

but there may be some small amounts of units wherein two SiOH groups have reacted with one mercaptoalkyltrialkoxysilane molecule, but these amounts are small enough that the character of the endblocked polydimethylsiloxane is not noticeably altered.

The organic peroxide of (C) can be any of the conventional organic peroxides, such as 2,4-dichlorobenzoyl peroxide, tertiary-butyl perbenzoate, benzoyl peroxide, di-tertiary-butyl peroxide, tertiary-butyl peroctoate, dicumyl peroxide and 2,5-bis(tertiary-butylperoxy-2,5-dimethylhexane.

Fillers are preferably used in the compositions of this invention, but are not required. The fillers can be both treated and untreated reinforcing fillers, such as fume silica and fume silica having triorganosiloxy groups, such as trimethylsiloxy groups on the surface, carbon black or precipitated silica, and extending fillers such as crushed or ground quartz, diatomaceous earth, and calcium carbonate.

The compositions of the present invention are made by mixing (A) and (B) in weight ratios sufficient enough to provide a molar ratio of moles of —SH group in (B) per mole of vinyl in (A) of from 1:1 to 10:1, preferably from 1.5:1 to 5:1. The compositions of this invention also contain from 1.4 to 5.5 parts by weight of organic peroxide (C) per 100 parts by weight of (A) and (B) combined. The compositions preferably contain filler up to 100 parts by weight per 100 parts by weight of (A) and (B) combined.

The compositions of this invention cure to elastomers either at room temperature or with heating, such as hot air vulcanization. The resulting elastomer has a dry or non-tacky surface. Air inhibition which is observed with conventional non-mercapto-containing peroxide cured silicone rubber composition is not observed and the inhibition by various materials such as sulfur and phosphorus in the platinum catalyzed compositions containing aliphatic unsaturated siloxanes and SiH containing siloxanes, is not observed. The elastomers have excellent unprimed adhesion to many substrates with either room temperature cure or heat cure as shown by cohesive failure.

The following example is presented for illustrative purposes and should not be construed as limiting the invention which is properly delineated in the claims.

EXAMPLE

An elastomer was prepared by mixing 97.1 g. of a trimethylsiloxy endblocked siloxane copolymer having (gamma-mercaptopropyl)methylsiloxane units and dimethylsiloxane units with 2.08 weight percent —SH group and a viscosity of $2.208 \times 10^{-3}$ square meters per second, 2.9 g. of a hydroxyl endblocked polymethylvinylsiloxane having 30.4 weight percent vinyl radical and 3.68 weight percent hydroxy group, 30.0 g. of a fume silica filler having the surface treated with trimethylsiloxy units and 7.5 g. of a peroxide mixture having 50 weight percent 2,4-dichlorobenzoyl peroxide and 50 weight percent of a trimethylsiloxy endblocked polydimethylsiloxane fluid. The composition cured to an elastomer with a tack free surface in 18 hours at room temperature, in 15 minutes at 175° C. when press cured in the absence of air and in 3 minutes at 150° C. in the presence of oxygen gas (air).

That which is claimed is:

1. A composition curable to an elastomer comprising a material prepared by mixing
    A. a polymethylvinylsiloxane consisting essentially of methylvinylsiloxane units, having linear or cyclic structures or mixtures thereof, said linear structures having hydroxyl endblocking or trimethylsiloxy endblocking, having an average of at least three siloxane units per molecule and a molecular weight sufficient to provide a viscosity of less than 0.05 Pa·s at 25° C.,
    B. a mercaptoorganopolysiloxane consisting essentially of a combination of units selected from dimethylsiloxane units, trimethylsiloxane units, units of the formula

units of the formula

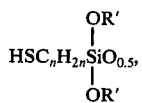

units of the formula

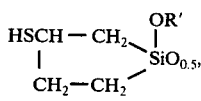

units of the formula

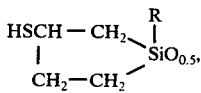

units of the formula

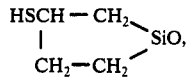

and units of the formula

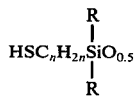

wherein R is a monovalent radical selected from the group consisting of alkyl radicals of from 1 to 3 carbon atoms inclusive and phenyl radicals, R' is methyl or ethyl and n has a value of from 1 to 4 inclusive, there being in said mercaptoorganopolysiloxane an average of at least two sulfur containing siloxane units per molecule and no more than 8 mol percent —SH containing siloxane units based on the total number of siloxane units in the mercaptoorganopolysiloxane, the molecular weight of the mercaptoorganopolysiloxane being at least 2000,
    A. and (B) being combined in a weight ratio sufficient enough to provide a molar ratio of moles of —SH group in
    B. per mole of vinyl radical in (A) of 1:1 to 10:1,
    C. an organic peroxide in an amount of from 1.4 to 5.5 parts by weight based on 100 parts by weight of (A) and (B) combined, and
    D. a filler in an amount of from 0 to 100 parts by weight per 100 parts by weight of (A) and (B) combined.

2. The composition according to claim 1 in which (A) is a mixture of polymethylvinylcyclosiloxanes having from 3 to 6 siloxane units per molecule.

3. The composition according to claim 1 in which (A) is a mixture of hydroxyl endblocked linear polymethylvinylsiloxane molecules having a viscosity of from 0.01 to 0.04 Pa·s at 25° C.

4. A method of preparing an elastomer comprising
I. mixing at a temperature below 50° C.
    A. a polymethylvinylsiloxane consisting essentially of methylvinylsiloxane units, having linear or cyclic structures or mixtures thereof, said linear structures having hydroxyl endblocking or trimethylsiloxy endblocking, having an average of at least three siloxane units per molecule and a molecular weight sufficient to provide a viscosity of less than 0.05 Pa·s at 25° C.,
    B. a mercaptoorganopolysiloxane consisting essentially of dimethylsiloxane units, trimethylsiloxane units, units of the formula

units of the formula

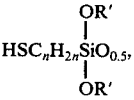

units of the formula

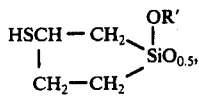

units of the formula

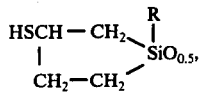

units of the formula

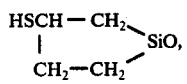

and units of the formula

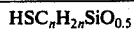

wherein R is a monovalent radical selected from the group consisting of alkyl radicals of from 1 to 3 carbon atoms inclusive and phenyl radicals, R' is methyl or ethyl and $n$ has a value of from 1 to 4 inclusive, there being in said mercaptoorganopolysiloxane an average of at least two sulfur containing siloxane units per molecule and no more than 8 mol percent —SH containing siloxane units based on the total number of siloxane units in the mercaptoorganopolysiloxane, the molecular weight of the mercaptoorganopolysiloxane being at least 2000, A. and (B) being combined in a weight ratio sufficient enough to provide a molar ratio of moles of —SH group in (B) per mole of vinyl radical in (A) of 1:1 to 10:1, C. an organic peroxide in an amount of from 1.4 to 5.5 parts by weight based on 100 parts by weight of (A) and (B) combined, and D. a filler in an amount of from 0 to 100 parts by weight per 100 parts by weight of (A) and (B) combined, thereafter II. curing the resulting mixture of (I) above 20° C.

5. The method in accordance with claim 4 in which the resulting mixture of (I) is heated above 50° C.

* * * * *

UNITED STATES PATENT AND TRADEMARK OFFICE
CERTIFICATE OF CORRECTION

PATENT NO. : 4,039,505
DATED : August 2, 1977
INVENTOR(S) : Gary R. Homan and Chi-Long Lee It is certified that error appears in the above-identified patent and that said Letters Patent are hereby corrected as shown below.

Attorney, Agent, or Firm - "Barrousch" should read "Borrousch"

Column 2, line 53 - the symbol "V" should be added at the right-hand margin

Column 2, line 44 - the word "silocane" should read "siloxane"

Column 5, line 20 - the word "liner" should read "linear"

Column 5, line 31 - "ular." should read "ule."

Column 6, line 38 - the phrase "-butylperoxy-2,5-" should read "-butylperoxy)-2,5-"

Column 7, line 17 - the word "hydroxy" should read "hydroxyl"

Signed and Sealed this

Fifteenth Day of December 1981

[SEAL]

Attest:

GERALD J. MOSSINGHOFF

Attesting Officer     Commissioner of Patents and Trademarks